US010922938B2

(12) United States Patent
Balasubramanian et al.

(10) Patent No.: US 10,922,938 B2
(45) Date of Patent: Feb. 16, 2021

(54) SYSTEMS AND METHODS FOR PROVIDING AN IMMERSIVE EXPERIENCE OF A FACILITY CONTROL ROOM USING VIRTUAL REALITY

(71) Applicant: Honeywell International Inc., Morris Plains, NJ (US)

(72) Inventors: Mourian Balasubramanian, Bangalore (IN); Jitendra Sitaram Chaurasia, Mumbai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/459,046

(22) Filed: Jul. 1, 2019

(65) Prior Publication Data

US 2021/0005068 A1    Jan. 7, 2021

(51) Int. Cl.
*G08B 13/196*    (2006.01)
*G05B 23/02*    (2006.01)
(Continued)

(52) U.S. Cl.
CPC ..... *G08B 13/19682* (2013.01); *G02B 27/017* (2013.01); *G05B 23/0216* (2013.01); *G06F 3/1446* (2013.01); *G08B 13/1963* (2013.01); *G08B 13/19645* (2013.01); *G02B 2027/014* (2013.01)

(58) Field of Classification Search
CPC ........ G08B 13/19682; G08B 13/19645; G08B 13/1963; G06F 3/1446; G02B 27/017; G02B 2027/014; G05B 23/0216
See application file for complete search history.

(56) References Cited

U.S. PATENT DOCUMENTS

2002/0010571 A1    1/2002 Daniel, Jr. et al.
2009/0319058 A1    12/2009 Rovaglio et al.
(Continued)

FOREIGN PATENT DOCUMENTS

KR    101683277 B1    12/2016

OTHER PUBLICATIONS

Bergroth et al., "Use PF O,,Ersove 3D Virtual Reality Environments in Control Room Validations," 12 pages, 2017.
(Continued)

*Primary Examiner* — Nam D Pham
(74) *Attorney, Agent, or Firm* — Seager Tufte & Wickhem LLP (57) ABSTRACT

A video surveillance system includes a plurality of video surveillance cameras each for producing a corresponding video stream, a server configured to receive and store the video streams, and a first control room having a video wall. The video wall may be operatively coupled to the server and may be configured to concurrently display two or more of the video streams from two or more of the plurality of video surveillance cameras in a first arrangement. The video surveillance system may further include a remote virtual reality headset with a display and a virtual reality controller operatively coupled to the virtual reality headset and the server. The virtual reality controller may be configured to receive the same two or more video streams that are displayed on the video wall in the first control room and display them in the virtual reality headset.

20 Claims, 5 Drawing Sheets

(51) Int. Cl.
    *G02B 27/01*     (2006.01)
    *G06F 3/14*     (2006.01)

(56) References Cited

U.S. PATENT DOCUMENTS

| 2012/0249588 A1 | 10/2012 | Tison et al. |
| 2015/0281659 A1* | 10/2015 | Hood .................. A61G 7/0524 348/143 |

OTHER PUBLICATIONS

Saraswathi et al., "Retinal Biometrics based Authentication and Key Exchange System," International Journal of Computer Applications, 19(1): pp. 0975-8887, Apr. 2011.

Zibran, "Eye Based Authentication: Iris and Retina Recognition," The University of Saskatchewan, Canada: Department of Computer Science, 63 pages, 2009.

Saraswathi et al., "Retinal Biometrics Based Authentication and Key Exchange System," International Journal of Computer Applications, vol. 19: (1), Apr. 2011.

Zibran, "Eye Based Authentication: Iris and Retina Recognition," The University of Saskatchewan Department of Computer Science, 63 pages, 2009.

Bergroth et al., "Use of Immersive 3D Virtual Reality Environments In Control Room Validations," NPIC & HMIT, 12 pages, 2017.

* cited by examiner

SYSTEMS AND METHODS FOR PROVIDING AN IMMERSIVE EXPERIENCE OF A FACILITY CONTROL ROOM USING VIRTUAL REALITY

TECHNICAL FIELD

The present disclosure relates generally to facility monitoring and more particularly to providing an immersive experience of a facility control room from a remote location using virtual reality.

BACKGROUND

Building control systems are generally known. Such systems often include, for example, Heating Ventilation and/or Air Conditioning (HVAC), fire, security and/or surveillance systems. In some instances, a control room is provided for monitoring one or more of the building control systems. For example, when the building control system includes a security and/or surveillance systems, the control room may include a set of monitors for displaying videos from two or more video surveillance cameras, as well as other information.

In some instances, a facility manager may want to monitor the actions of the operators in the control room. This typically requires that the facility manager travel to the control room. In other instances, operators in the control room may want to talk to a facility manager to help decide what action to take in response to a particular event. At present, an operator can call the facility manager by phone to verbally discuss an event, and/or may request that the facility manager travel to the control room to view the set of monitors in the control room to help collaboratively decide what action to take. However, discussing an event over the phone may be challenging since the facility manager does not have visual access to the set of monitors in the control room. Also, having the facility manager travel to the control room may not be practical, especially when the facility manager is responsible for multiple facilities. What would be desirable is an immersive system that allows a facility manager to view monitors in the control room and to collaborate with the operators in the control room from a remote location.

SUMMARY

This disclosure relates generally to facility monitoring and more particularly to providing an immersive experience of a facility control room from a remote location using virtual reality.

In one specific example, a video surveillance system may include a plurality of video surveillance cameras each for producing a corresponding video stream, a server configured to receive and store the video streams from the plurality of video surveillance cameras, and a first control room having a video wall. The video wall may be operatively coupled to the server and configured to concurrently display two or more of the video streams from two or more of the plurality of video surveillance cameras in a first arrangement on the video wall. The video surveillance system may further include a remote virtual reality headset with a display and a virtual reality controller operatively coupled to the virtual reality headset and the server. The virtual reality controller may be configured to receive the same two or more video streams that are displayed on the video wall in the first control room from the server and to concurrently display the received two or more video streams on the display of the virtual reality headset in the same first arrangement as on the video wall. An audio channel may also be provided between the control room and the virtual reality headset.

In another example, a method of operating a video surveillance system may include concurrently displaying two or more video streams from two or more of a plurality of video surveillance cameras in a first arrangement on a video wall in a first control room and concurrently displaying the same two or more video streams on a display of a remote virtual reality headset in the same first arrangement as on the video wall in the first control room. Again, in some cases, an audio channel may also be provided between the control room and the virtual reality headset.

In another example, a system for providing remote access to two or more video surveillance system control rooms may include one or more servers configured to receive and store first video streams from a plurality of first video surveillance cameras in a first building and a first control room having a first video wall. The first video wall may be operatively coupled to one or more of the servers and configured to concurrently display two or more of the first video streams from two or more of the plurality of first video surveillance cameras in a first arrangement on the first video wall. The system may further include a remote virtual reality headset with a display and a virtual reality controller operatively coupled to the virtual reality headset and one or more of the servers. The virtual reality controller may be configured to, upon a first request from a user of the remote virtual reality headset, receive the same two or more first video streams that are displayed on the first video wall in the first control room from one or more of the servers and to concurrently display the received two or more first video streams on the display of the virtual reality headset in the same first arrangement as on the first video wall. An audio channel may also be provided between the first control room and the virtual reality headset.

In some cases, the system may further include a second control room having a second video wall. The second video wall may be operatively coupled to one or more of the servers and may be configured to concurrently display two or more second video streams from two or more of a plurality of second video surveillance cameras in a second building in a second arrangement on the second video wall. The virtual reality controller may be configured to, upon a second request from the user of the remote virtual reality headset, receive the same two or more second video streams that are displayed on the second video wall in the second control room from one or more of the servers and to concurrently display the received two or more second video streams on the display of the virtual reality headset in the same second arrangement as on the second video wall. An audio channel may also be provided between the second control room and the virtual reality headset.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure relates generally to facility monitoring and more particularly to providing an immersive experience of a facility control room from a remote location using virtual reality. While the disclosure below uses security and/or surveillance systems as a concrete example, it is contemplated that the present disclosure may be used in control rooms of many different types of systems such as Heating Ventilation and/or Air Conditioning (HVAC) systems, fire protection systems, power plants, and/or any other suitable system where it may be desirable to provide an immersive experience of a control room from a remote location using virtual reality In a security and/or surveillance systems, a facility manager may view the video feeds shown in the control room, and in some cases may change which video feeds are displayed in the control room, without being physically present in the control room. In some cases, the facility manager may be given complete control over the control room from a remote location. In some cases, a video wall in the control room is replicated in a portable virtual reality headset for viewing by the facility manager. A video wall may include one or more monitors in the control room, and need not be mounted on a "wall" of the control room. In some cases, multiple monitors are arranged in an array, but this is not required. In some instances, an audio channel may also be provided between the control room and the virtual reality headset to assist the facility manager in communicating with the operators in the control room.

Generally, a security and/or surveillance systems may include a plurality of video cameras placed at various locations around a building. The video cameras may be in communication with a server or the like that is configured to receive and/or store the video feeds. The video feeds may be selectively transmitted from the server to the video wall in the control room. Often, the video wall does not have enough space to concurrently display the video feeds from all of the video cameras. In this case, an operator may select which video feed to view on the monitors at any given time, and may change the arrangement of the video feeds that are displayed on the monitors. The video feed may be real time video feed and/or recorded video feeds, depending on the situation. When an event occurs, the control room operator may set off an alarm, contact security personnel and/or perform some other action. In some cases, the operator may notify a facility manager (e.g., via a phone call, e-mail, text message, etc.) that the facility manager's input is desired. In some cases, the notification may be automatically generated.

The facility manager may be provided with a portable display, such as, but not limited to a portable virtual reality headset or other portable display (e.g. cell phone, tablet computer, laptop computer, desktop computer, etc.). The portable display may have wireless communication capabilities such that video feeds may be received at the display via Wi-Fi and/or cellular communication protocols, but this is not required. The facility manager may use the portable display to access the video feeds from the video cameras. The portable display may be configured to display the video feeds in the same manner as they are displayed in the control room, such that the facility manager is viewing the same video feeds in the same arrangement as the control room operator. In some cases, the facility manager may change which of the video feeds are displayed in the control room and/or the arrangements of the displayed video feeds. For example, the facility manager may remotely actuate the video cameras (e.g., pan, tilt, zoom, etc.) to change the field of view of a particular camera, just like in the control room. Any changes made by the facility manager via the portable display (or other remote input device) may be concurrently visible on the video wall in the control room. Similarly, any changes in the field of view of a camera made at the control room may be concurrently viewable by the facility manager on the portable display. In some cases, the facility manager may be given complete control over the control room.

The portable display may be provided with audio communication capabilities such that the facility manager may speak with the control room operator. The facility manager may access the video feeds in response to an alarm event (e.g., intruder), or as routine monitoring and/or training of the operators. In some cases, the portable display may have access to a video feed of a video camera located in the control room such that the facility manager can assess non-verbal cues of the control room operator, but this is not required. In some cases, the portable display may be configured to be in selective communication with a plurality of different facilities such that the facility manager may access the control rooms of each of the different facilities, as needed.

Figure 1:
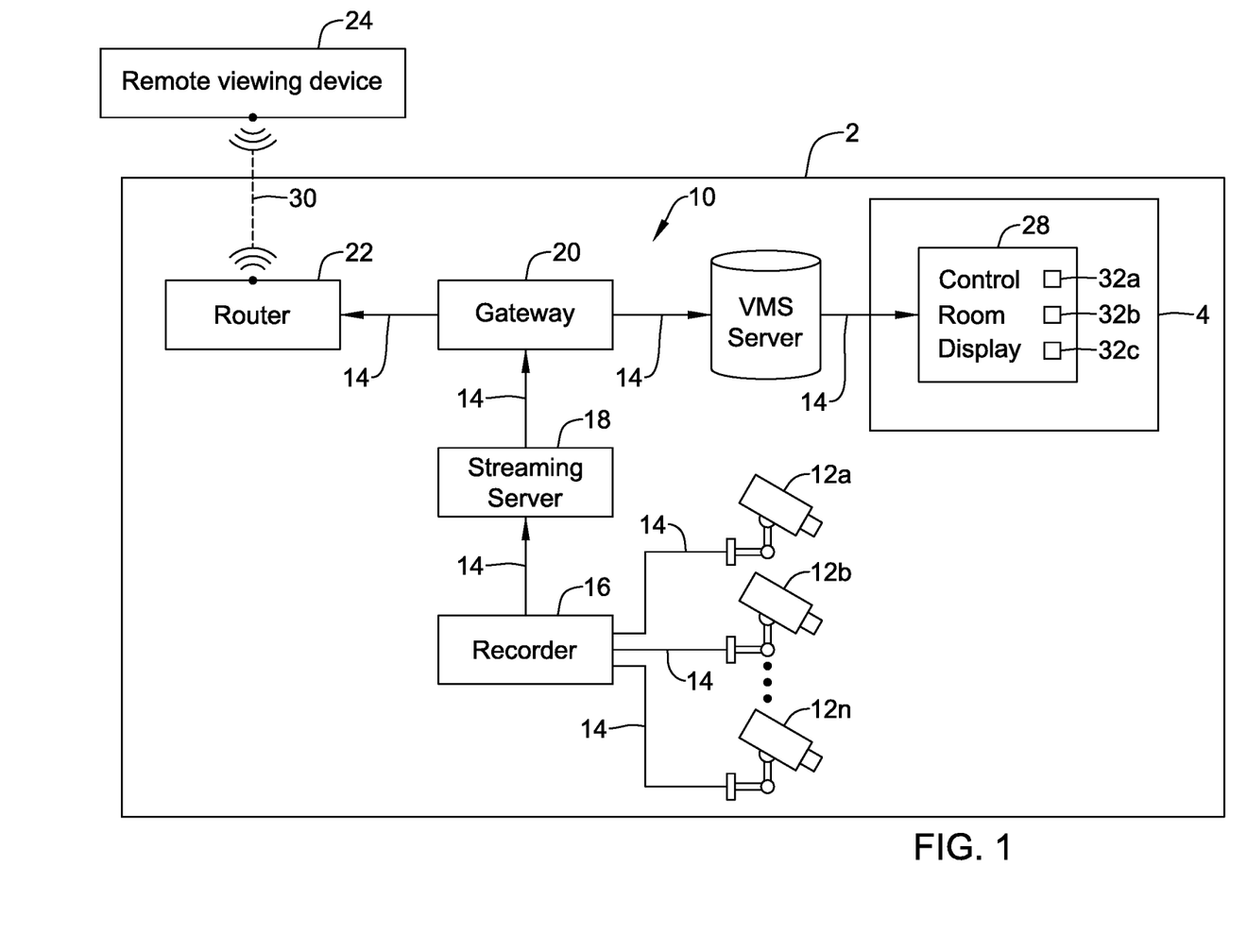
FIG. 1 is a schematic diagram of an illustrative system for providing remote access to a video surveillance system control room of a building control system.

FIG. 1 is a schematic diagram of an illustrative video surveillance system 10 of a building 2. The video surveillance system 10 may be a part of a building management system and/or a security system, although this is not required. For example, while not explicitly shown, the video surveillance system 10 may be part of or in communication with other building systems, such as, but not limited to, heating, ventilation, and air conditioning (HVAC) systems, lighting systems, intrusion detection systems, fire detection/suppression systems, building access control systems, etc.

The illustrative video surveillance system 10 may include a plurality of video cameras 12a, 12b, 12n (collectively, 12). For example, the video surveillance system 10 may include any number of video surveillance cameras such as, but not limited to, one or more, two or more, five or more, ten or more, 20 or more, etc. Some video surveillance installations may include hundreds, thousands, or more video cameras 12. The video surveillance cameras are not limited to a particular type. In some embodiments, cameras can be static cameras, pan-tilt-zoom (PTZ) cameras, etc. The video surveillance cameras are not necessarily limited to the visible spectrum. For example, the video surveillance cameras may include sensors that detect waves beyond the visible spectrum to provide imagery of the environment, including but not limited to near-field infrared, far-field infrared, thermal infrared, X-ray, and other imagery methods. The video surveillance cameras can be used to monitor a particular location within or exterior to the building 2 or multiple locations within or exterior to the building 2. For example, one surveillance camera 12 can be used to monitor an entryway to the particular building 2. Other surveillance cameras 12 can be used to monitor each room in the building 2, and still another surveillance camera 12 can be used to monitor the exit door of the building 2. In some systems, multiple surveillance cameras 12 can be located in a single room. In some cases, one or more of the video surveillance cameras may live stream video data over a network 14 to a video recorder 16. In some cases, one or more of the video surveillance cameras may transmit a sequence of still images at a regular interval, such as one second, or may send live stream video data or a sequence of still images only after motion or some other event is detected.

The network may be a wired network including, but not limited to, a local area network (LAN) or a wide area network (WAN). In some cases, the video surveillance cameras may communicate using a wireless communication protocol such as, for example, cellular communication, RF6, ZigBee, Bluetooth, Bluetooth® low energy (BLE), Wi-Fi, IrDA, dedicated short range communication (DSRC), EnOcean, Redlink or any other suitable wireless protocols, as desired. The video recorder 16, when provided, may be any type of recorder configured to record the video data, such as, but not limited to a digital video recorder (DVR), network video recorder (NVR), etc. The video data may be transmitted from the video recorder 16 over the network to a streaming device 18. The streaming device 18 may be a server, a PC, or other computing device including a processor and/or controller, a memory, a data port, input/output ports, etc. In some cases the video recorder 16 and/or the streaming device 18 may be physically located within the building 2 or may be a hub located external to the building 2 at an external or remote server also referred to as "the cloud." The streaming device 18 may include a video capture device with software that allows the video data to be transferred from the streaming device 18. For example, the streaming device 18 may be a server configured to receive, store, and transmit the video streams from the plurality of video surveillance cameras. The streaming device 18 may be connected to a gateway 20 via the network. The gateway 20 may be an internet gateway or other device that allows one or more of the video surveillance system 10 components, as described herein, to communicate over a wide area network (WAN) such as, for example, the Internet. In some cases, the gateway 20 may be in communication with a router 22 which allows the video data to be transferred over a wired or wireless network 30 (which may be different from the first network 14) to a portable remote viewing device 24, as will be described in more detail herein. It is contemplated that the portable remote viewing device 24 may be at a location remote from the building 2, at or near the building 2, or within the building 2, as desired. The portable remote viewing device 24 may be a portable display, such as, but not limited to a portable virtual reality headset or other portable display (e.g. cell phone, tablet computer, laptop computer, desktop computer, etc.).

The gateway 20 may also be connected to or be in communication with a video management system device 26 via the network 14. The video management system device 26 may be a server, a PC, or other computing device including a processor and/or controller, a memory, a data port, input/output ports, etc. In some cases the video management system device 26 may be physically located within the building 2 or may be a hub located external to the building 2 at an external or remote server also referred to as "the cloud." The video management system device 26 may allow the video data to be transferred from the video management system device 26 to a control room display 28 situated in a control room 4 of the building 2. The control room display 28 may include a video wall including one or more display devices 32a, 32b, 32c (collectively, 32) (e.g., computer monitors, televisions, etc.). The video wall 28 may include any number of display devices 32 desired, such as, but not limited to, one, two, three, four, or more. The video wall 28 may be configured to concurrently display two or more of the video streams from the video surveillance cameras 12. For example, the video wall 28 may be configured to concurrently or simultaneously display a video feed showing the front door, a video feed showing a rear exit, and a video feed showing an interior room. This is just one example. The video wall 28 may be configured to show any number and/or combination of video feeds from the available video surveillance cameras. In some cases, a control room operator can change which video feeds are displayed and/or manipulate (e.g., pan, tilt, zoom) any of the video feeds, as desired. It is further contemplated that more than one video feed may be displayed on a single display device 32 or each of the display devices 32 may display a single video feed.

Generally, the video wall 28 may be just one monitor on a desk. In other instances, the video wall 28 may be a large wall of monitors 32 for displaying video from surveillance cameras 12 throughout the site or building 2. One or more operators may be stationed within the control room 4 to view the monitor(s) 32 to monitor both steady state and crisis situations throughout the building 2, such as during alarm events. In some cases, the one or more operators can control which video feed and/or the arrangement of the video feed that are displayed on the monitor(s) 32, and may control other parts of the system (e.g., the video surveillance cameras) via user input devices in the control room 4, such as, for example, a joystick, keyboard, mouse, and the like. When an emergency or other event occurs, such as, but not limited to, a break-in, the control room personnel may need to act immediately. However, in some cases, a facility manager or other decision making authority may need to make a final decision on a course of action to take.

As described above, the video streams from the video surveillance cameras may be transmitted to a portable remote viewing device 24 carried by the facility manager. The portable remote viewing device 24 may be configured to display the video streams from the video surveillance cameras to the facility manager regardless of the facility manager's location. In some cases, the portable remote viewing device 24 may be a virtual reality headset that provides an immersive experience to the facility manager. In some cases, as the head of the facility manager is turned, the field of view of the virtual control room moves accordingly. As the head of the facility manager moves closer to the virtual video wall, the video wall becomes larger. This may provide the facility manager with an immersive experience. While such virtual reality effects may be used, it is not necessary. For example, in some cases, the field of view presented in the virtual reality headset remains the same when the facility manager turns his head, and simply concurrently shows the video wall that is shown in the control room.

Figure 2:
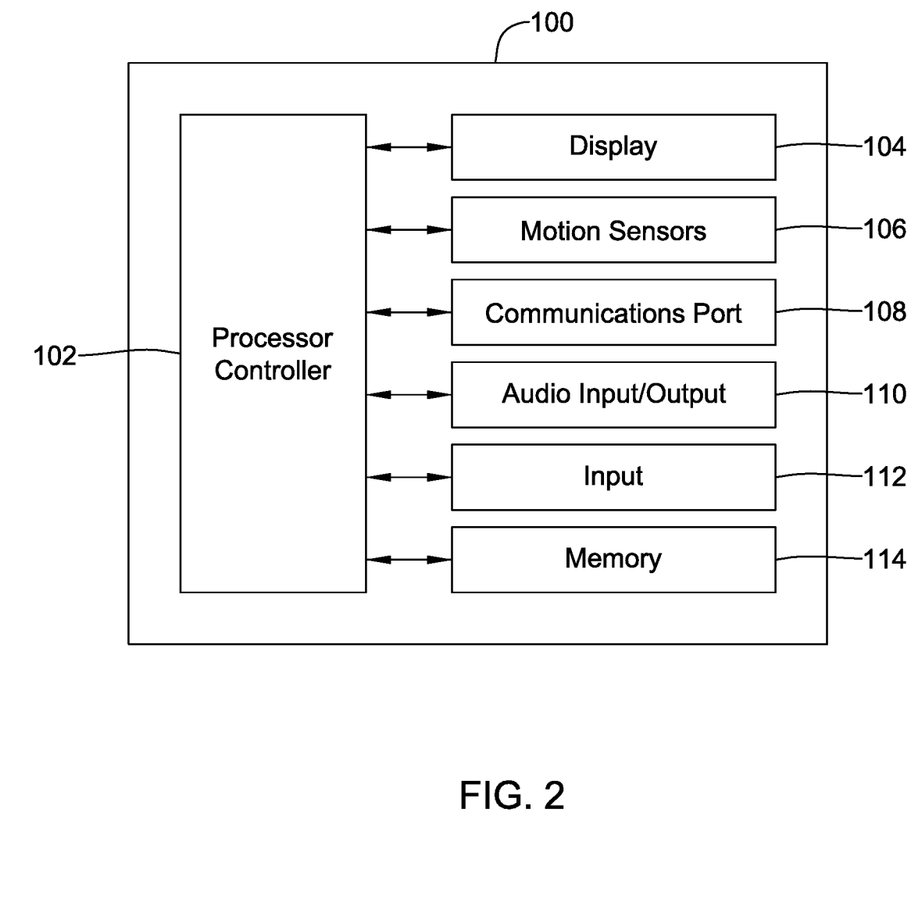
FIG. 2 is a block diagram of an illustrative virtual reality headset.

FIG. 2 is a block diagram of an illustrative virtual reality headset 100. The virtual reality headset 100 may include a processor/controller 102. The processor/controller 102 may be configured to receive video images from a video surveillance system 10 and render the video images on display 104. The virtual reality headset 100 may include one or more controllers or processors 102 that execute instructions stored in the system memory 114. The controllers or processors 102 may include a programmable microprocessor. Such a programmable microprocessor may allow a user to modify the control logic of the virtual reality headset 100 even after it is deployed in the field (e.g., firmware update, application update). The system memory 114 of the virtual reality headset 100 can include computer system readable media in the form of volatile memory, such as random access memory (RAM) and/or cache memory. The virtual reality headset 100 may further include other removable/non-removable, volatile/non-volatile computer system storage media.

The processor/controller 102 may be further configured to receive commands via an input device 112 (e.g., keyboard, joystick etc.). In some cases, the input device 112 may be configured to manipulate the video surveillance cameras of a video surveillance system 10 from a remote location (e.g., wherever the virtual reality headset 100 is located). In some cases, the input device 112 may be in wired or wireless communication with the processor/controller 102.

The display 104 may be configured such that when the user wears the virtual reality headset, the user may view the video wall 28 as it is displayed in the control room 4. In some cases, the virtual reality headset 100 may further include one or more motion sensors 106. The motion sensors 106 may be configured to track motion of the head and update the display 104 according to the direction the user is looking. The virtual reality headset 100 may further include an audio input and/output 110. For example, the virtual reality headset 100 may include a microphone for receiving an audio input from the user of the virtual reality headset 100 and a speaker for providing an audio output to the user of the virtual reality headset 100. This may allow the user of the virtual reality headset 100 to verbally communicate with the operators in the control room 4 without an additional communication device.

The virtual reality headset 100 may further include an Input/Output interface or communications port 108. The processor/controller 102 of the virtual reality headset 100 may be operatively coupled to communications port 108 and may use the communications port 108 to communicate with streaming device 18, video surveillance cameras and/or other components of the video surveillance system 10. The virtual reality headset 100 may be connected to the video surveillance system 10 and/or various components thereof via a wireless internet connection (e.g., Wi-Fi) and/or a cellular connection (and/or a wired connection). It is contemplated that the processor/controller 102 may both receive information and/or commands from the video surveillance system 10 and transmit information and/or commands to the video surveillance system 10. For example, the processor/controller 102 may use the input device 112 to command a video camera 12 to change a field of view by zooming, move, etc. It is further contemplated that the processor/controller 102 may use the input device 112 to manipulate which video streams are displayed on the video wall 28 of the control room 4 and/or the display 104 of the virtual reality headset 100. While the virtual reality headset 100 is described as communicating with the video surveillance system 10 of FIG. 1, it is contemplated that the virtual reality headset 100 may be configured to communicate with more than one video surveillance system. The more than one video surveillance systems need not be in the same building 2 as the first video surveillance system 10 to communicate with the virtual reality headset 100. For example, additional video surveillance systems accessible by the virtual reality headset 100 may be located in or at different buildings, different geographical locations, etc. from the first video surveillance system 10.

Figure 3:
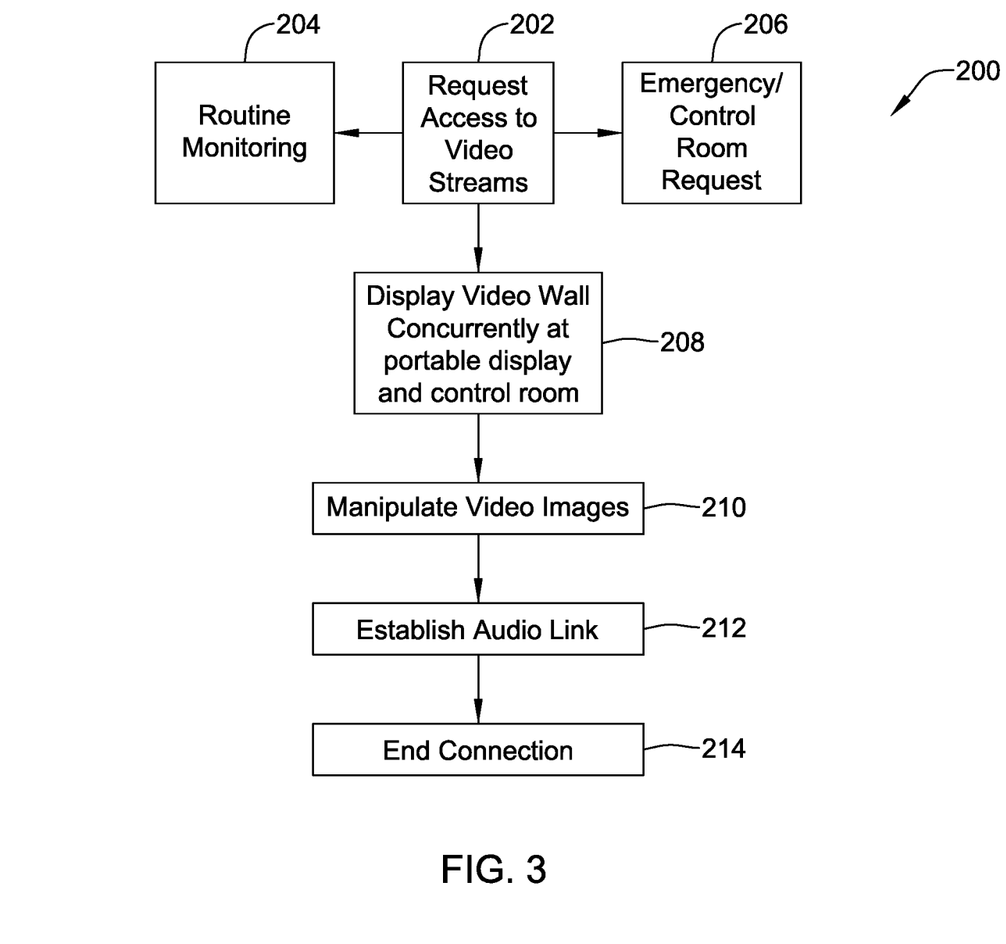
FIG. 3 is a flow chart of an illustrative method of operating the video surveillance system of FIG. 1.

FIG. 3 is an illustrative flow chart of a method 200 of operating the video surveillance system 10 of FIG. 1 to concurrently view the video stream in the control room 4 and the virtual reality headset 100. The illustrative method 200 may allow a user of the virtual reality headset 100, such as a facility manager, decision authority, or other personnel to view the video feeds shown in the control room 4 without being physically present in the control room 4. It is further contemplated that the user of the virtual reality headset 100 may view, such as at different times, the video wall 28 of more than one control room using a single virtual reality headset 100.

To begin, the user of the virtual reality headset 100 may request access to the video streams, as shown at block 202. In some cases, the user of the virtual reality headset 100 may request access as part of a routine monitoring of the building 2, as shown at block 204. This may allow the user to routinely check in on day-to-day operations without being physically present in the control room 4 and/or the building 2. In other cases, the user of the virtual reality headset 100 may request access in response to an event and/or a request from an operator in the control room 4. For example, when an event occurs, the control room operator may notify the user (e.g. facility manager) of the virtual reality headset 100 (e.g., via a phone call, e-mail, text message, etc.) that the user's input is desired. In some cases, the notification may be automatically generated by the system.

Figure 4A:
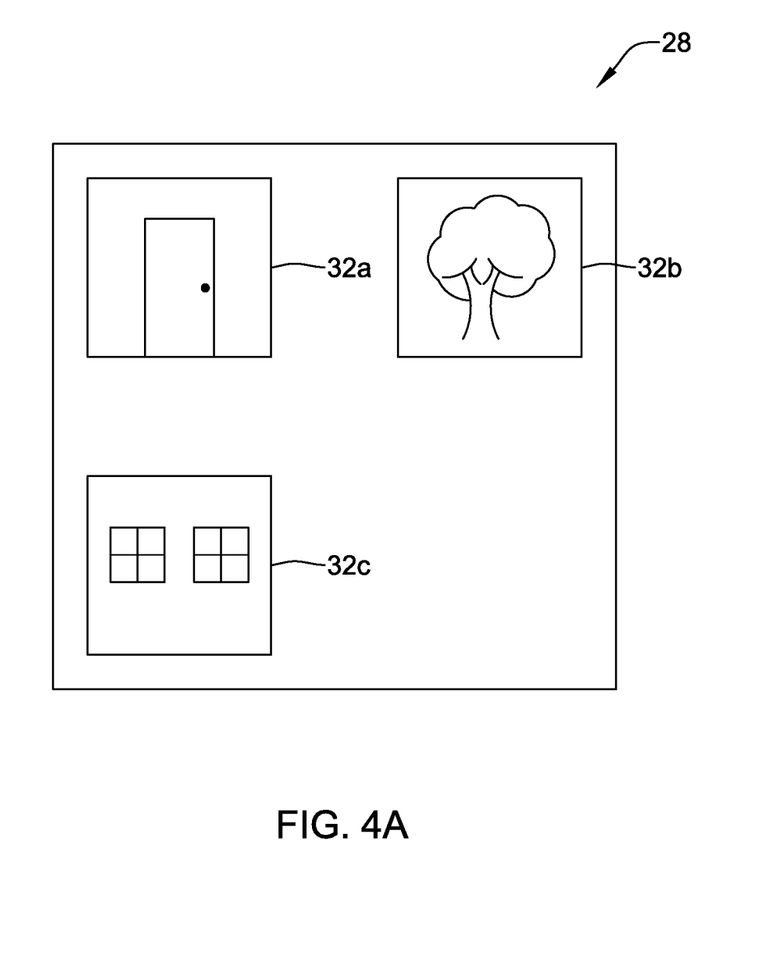
FIGS. 4a and 4b are schematic views of an illustrative video wall and the display of a virtual reality headset concurrently displaying the same video feeds in the same arrangement.
Figure 4B:
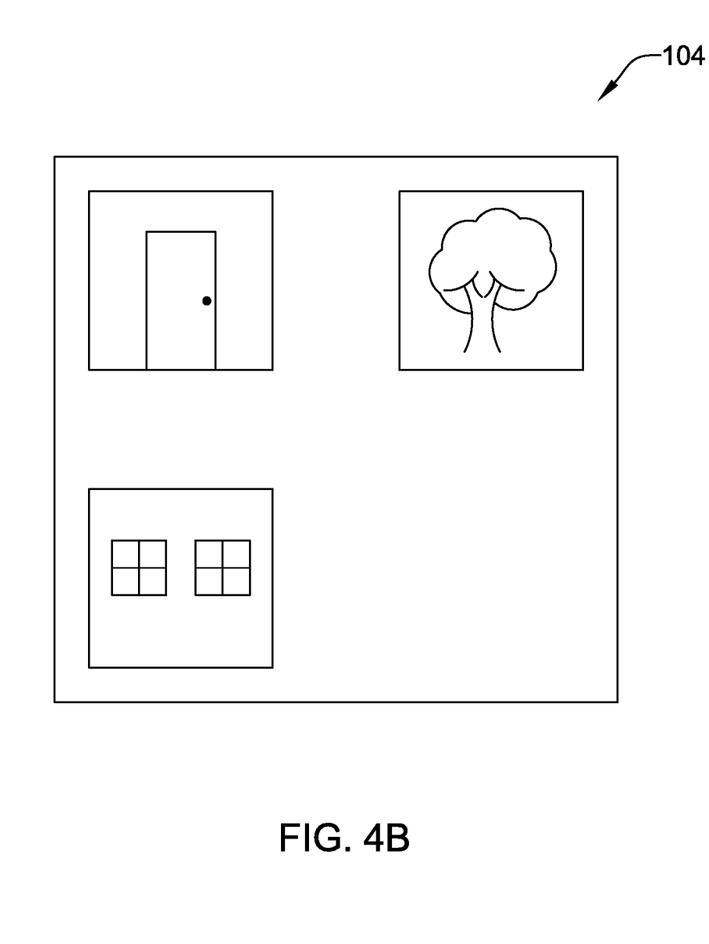

The user of the virtual reality headset 100 may use the input device 112 associated with the virtual reality headset 100 to relay a command to the controller 102 to access the streaming device 18. Upon receiving the request, the controller 102 may operatively connect to the streaming device 18 (e.g., via router 22 and/or gateway 20) to receive the same video streams that are displayed on the video wall 28 in the control room. It is contemplated that the video streams from the video surveillance cameras may be concurrently displayed at both the virtual reality headset 100 and the video wall 28 and in the same arrangement, as shown at block 208. This may allow the user (e.g. facility manager) of the virtual reality headset 100 and the control room operator to be concurrently viewing the same video feeds in the same arrangement as illustrated in FIGS. 4a and 4b. FIG. 4a shows a schematic view of an illustrative video wall 28 having three displays 32a, 32b, 32c with three different video streams. FIG. 4b shows a schematic view of the display 104 of the virtual reality headset 100 that concurrently displays the same video feeds in the same arrangement as the video wall 28 of FIG. 4*a*.

Returning to FIG. 3, in some cases, at least two or more video streams from two or more video surveillance cameras are viewed concurrently and/or simultaneously at any given time. In some embodiments, the video surveillance system 10 may be programmed such that certain alarm events automatically cause the display of certain video streams on the video wall 28 in the control room, which are also concurrently displayed on the virtual reality headset 100. For example, an alarm that indicated unauthorized entry via an access point may automatically prominently display the video stream from a video surveillance camera directed at the access point on the video wall 28. It is contemplated that in some cases, the video streams are transmitted in real time whereas in other cases, the video streams may have been previously recorded. It is further contemplated that the video streams to be viewed on the virtual reality headset 100 may be customized based on requirements of the user of the virtual reality headset 100. For example, when a user of the virtual reality headset 100 is using the virtual reality headset 100 for routine monitoring, the user of the virtual reality headset 100 may have a preconfigured arrangement of the video streams which the user wishes to view upon connection. In such an instances, the user of the virtual reality headset 100 may not be viewing the same video feed that are displayed on the video wall 28 in the control room. It is further contemplated that different users of a virtual reality headset 100 (which can be the same virtual reality headset 100 or separate virtual reality headset 100*s*) may each have unique preconfigured arrangements (e.g. preferences) of video streams to be viewed for casual (e.g., non-emergency) situations.

Once the connection has been established between the virtual reality headset 100 and the streaming device 18 (e.g., via wired or wireless communication capabilities), the input device of the virtual reality headset 100 may be used to manipulate at least one of the plurality of video streams shown on the display devices 32 of the video wall 28 and/or video surveillance cameras, as shown at block 210. The at least one of the plurality of video streams or video surveillance cameras that is manipulated may correspond to at least one of the video streams that are concurrently displayed in the first arrangement on the video wall 28 and concurrently displayed on the display 104 of the virtual reality headset 100 in the same first arrangement as on the video wall 28. For example, the user (and/or the control room operators) may view the video feeds in a first arrangement on the virtual reality headset 100 and/or video wall 28 and manipulate the video streams into a second arrangement different from the first arrangement. Any changes made to the video streams viewable at the control room 4 via the virtual reality headset 100 and/or via the control room operators are also made concurrently to the video streams viewable at the virtual reality headset 100. The changes may include zooming, panning, tilting one or more of the video surveillance cameras, rearranging an order of display of the video streams, resizing of a video stream (e.g., enlarging a particular video stream relative to another video stream), changing which video streams are viewed, etc. In some cases, the virtual reality headset 100 may have access to a video feed of a video surveillance camera 12 located in the control room 4 such that the user of the virtual reality headset 100 can view non-verbal cues of the control room operator(s) along with the video fees on the video wall in the control room, but this is not required.

An audio link may be established between the user of the virtual reality headset 100 and the control room operator, as shown at block 212. This may allow the user of the virtual reality headset 100 and the control room operator to speak to one another and discuss the situation observed on the video wall. It contemplated that the audio link may be established at any time and is not limited to being established after the user of the virtual reality headset 100 begins to receive the video streams or other specific time point. In some cases, the audio link may be established via the audio input/output 110 of the virtual reality headset 100, although this is not required. Other communication devices may be used in addition to or in place of the audio input/output 110 of the virtual reality headset 100, as desired.

The user of the virtual reality headset 100 may terminate the connection between the virtual reality headset 100 and the streaming device 18. After which, the user of the virtual reality headset 100 is free to request access to a second video wall of a second control room different from the one previously accessed. The second video wall may be part of a second video surveillance system which may be similar in form and function to the video surveillance system 10 described herein. For example, the second video surveillance system may be at a different part of the same building as the first video surveillance system, at a different building in a similar geographical location, at a completely different geographical location, etc. In a similar manner to that described with respect to the first video surveillance system 10, the video surveillance system 10 may be configured to receive two or more second video streams that are displayed on the second video wall (e.g., in a second arrangement) in the second control room, and may concurrently display the received two or more second video streams on the display of the virtual reality headset 100 in the second arrangement. In some instances, the video walls of two or more different control rooms can be viewed simultaneously on the same display 104 of the virtual reality headset 100. This may allow for collaboration across different control rooms.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A video surveillance system comprising:
    a plurality of video surveillance cameras each for producing a corresponding video stream;
    a server configured to receive and store the video streams from the plurality of video surveillance cameras;
    a first control room having a video wall, wherein the video wall is operatively coupled to the server and is configured to concurrently display two or more of the video streams from two or more of the plurality of video surveillance cameras in a first arrangement on the video wall;
    a remote virtual reality headset with a display; and
    a virtual reality controller operatively coupled to the virtual reality headset and the server, wherein the virtual reality controller is configured to receive the same two or more video streams that are displayed on the video wall in the first control room from the server and to concurrently display the received two or more video streams on the display of the virtual reality headset in the same first arrangement as on the video wall.

2. The video surveillance system of claim 1, wherein the virtual reality controller is configured to receive a user request from a user of the remote virtual reality headset to begin receiving the same two or more video streams that are displayed on the video wall in the first control room from the server and to display the received two or more video streams on the display of the virtual reality headset in the same first arrangement as on the video wall.

3. The video surveillance system of claim 1, wherein at least some of the plurality of video surveillance cameras are configured to be manipulated via an input device in the first control room and via an input device at the virtual reality headset.

4. The video surveillance system of claim 3, wherein at least one of the plurality of video surveillance cameras that is configured to be manipulated corresponds to at least one of the two or more video streams that are concurrently displayed in the first arrangement on the video wall and concurrently displayed on the display of the virtual reality headset in the same first arrangement as on the video wall.

5. The video surveillance system of claim 1, wherein the virtual reality headset include an audio input and an audio output for audio communication with an operator in the first control room.

6. The video surveillance system of claim 1, wherein the virtual reality headset includes a wireless communication capabilities for wirelessly communicating with the virtual reality controller.

7. The video surveillance system of claim 6, wherein virtual reality headset includes Wi-Fi and/or cellular communication capabilities.

8. The video surveillance system of claim 1, wherein, upon request from a user of the virtual reality headset, the virtual reality controller is configured to receive two or more second video streams that are displayed in a second arrangement on a second video wall in a second control room, and to concurrently display the received two or more second video streams on the display of the virtual reality headset in the same second arrangement as on the second video wall in the second control room.

9. A method of operating a video surveillance system, comprising:
concurrently displaying two or more video streams from two or more of a plurality of video surveillance cameras in a first arrangement on a video wall in a first control room; and
concurrently displaying the same two or more video streams on a display of a remote virtual reality headset in the same first arrangement as on the video wall in the first control room.

10. The method of claim 9 further comprising:
receiving a user request from a user of the remote virtual reality headset to begin displaying the same two or more video streams on the display of the remote virtual reality headset in the same first arrangement as on the video wall in the first control room.

11. The method of claim 9, further comprising:
manipulating a pan, tilt and/or zoom of one of the plurality of video surveillance cameras, resulting in a manipulated video stream, wherein the manipulated video stream corresponds to one of the two or more video streams that are displayed in the first arrangement on the video wall in the first control room and is displayed on the display of the remote virtual reality headset in the same first arrangement as on the video wall in the first control room.

12. The method of claim 9, further comprising:
establishing an audio communication link between the first control room and the remote virtual reality headset; and
communicating between a user of the remote virtual reality headset and an operator in the first control room across the established audio communication link.

13. The method of claim 9, further comprising:
receiving a request from a user of the virtual reality headset
in response to receiving the request from the user of the virtual reality headset:
concurrently displaying two or more second video streams from two or more of a plurality of second video surveillance cameras in a second arrangement on a second video wall in a second control room; and
concurrently displaying the same two or more second video streams on the display of the remote virtual reality headset in the same second arrangement as on the second video wall in the second control room.

14. The method of claim 9, further comprising wirelessly transmitting the two or more video streams to the remote virtual reality headset.

15. The method of claim 9, receiving input from a user of the remote virtual reality headset that changes which of the two or more video streams from the plurality of video surveillance cameras are displayed on the display of the remote virtual reality headset and likewise displayed on the video wall in the first control room.

16. The method of claim 15, receiving input from an operator in the first control room that changes which of the two or more video streams from the plurality of video surveillance cameras are displayed on the video wall in the first control room and likewise displayed on the display of the remote virtual reality headset.

17. A system for providing remote access to two or more video surveillance system control rooms, the system comprising:
one or more servers configured to receive and store first video streams from a plurality of first video surveillance cameras in a first building;
a first control room having a first video wall, wherein the first video wall is operatively coupled to one or more of the servers and is configured to concurrently display two or more of the first video streams from two or more of the plurality of first video surveillance cameras in a first arrangement on the first video wall;
a remote virtual reality headset with a display; and
a virtual reality controller operatively coupled to the virtual reality headset and one or more of the servers, wherein the virtual reality controller is configured to, upon a first request from a user of the remote virtual reality headset, receive the same two or more first video streams that are displayed on the first video wall in the first control room from one or more of the servers and to concurrently display the received two or more first video streams on the display of the virtual reality headset in the same first arrangement as on the first video wall.

18. The system of claim 17, further comprising:
a second control room having a second video wall, wherein the second video wall is operatively coupled to one or more of the servers and is configured to concurrently display two or more second video streams from two or more of a plurality of second video surveillance cameras in a second building in a second arrangement on the second video wall; and wherein the virtual reality controller is configured to, upon a second request from the user of the remote virtual reality headset, receive the same two or more second video streams that are displayed on the second video wall in the second control room from one or more of the servers and to concurrently display the received two or more second video streams on the display of the virtual reality headset in the same second arrangement as on the second video wall.

19. The system of claim 18, wherein at least some of the plurality of first video surveillance cameras can be manipulated by an operator in the first control room and from a user of the remote virtual reality headset, and at least some of the plurality of second video surveillance cameras can be manipulated by an operator in the second control room and from the user of the remote virtual reality headset.

20. The system of claim 17, wherein an alarm event automatically selects at least one of the first video streams from the plurality of first video surveillance cameras that is displayed on the first video wall in the first arrangement.

* * * * *